US005493906A

United States Patent [19]
Sen-Zhi

[11] Patent Number: 5,493,906
[45] Date of Patent: Feb. 27, 1996

[54] AUTOMATIC OFFSET CONTROL FOR CONSTANT TEMPERATURE ANEMOMETER

[75] Inventor: Sheng Sen-Zhi, Beijing, China

[73] Assignee: Peking University, Beijing, China

[21] Appl. No.: 252,265

[22] Filed: Jun. 1, 1994

[51] Int. Cl.$^6$ ..................................................... G01F 1/68
[52] U.S. Cl. ...................................... 73/204.15; 73/204.14
[58] Field of Search ........................... 73/204.14, 204.15, 73/204.19; 324/721, 725; 374/172, 173, 54

[56] References Cited

U.S. PATENT DOCUMENTS

| | | | |
|---|---|---|---|
| 4,523,462 | 6/1985 | Kolodjski | 73/204.15 |
| 4,854,176 | 8/1989 | Czarnocki et al. | 73/204.19 |
| 5,122,756 | 6/1992 | Nelson | 324/725 |

OTHER PUBLICATIONS

Article entitled "Recent Researches on Experimental Turbulence in Peking University" (pp. 82, 88, 89, 95).
Proceedings of the International Conference on Fluid Mechanics and Theoretical Physics, Beijing, China, by Zhonglei, et al published Jun. 6, 1992.
IFV–900 Article (Chinese), vol. 9, No. 4, Dec. 1992 (pp. 14–18).
IFV–900 Brochure (Chinese), Sep. 1992.
Article entitled "A Method for Determination and Control of the Frequency Response of the Constant–Temperature Hot–Wire Anemometer" in Journal of Fluid Mechanics by N. B. Wood, vol. 67, pp. 769–786, 1974.
Article entitled "A Study of the Constant–Temperature Hot–Wire Anemometer" in Journal of Fluid Mechanics by A. E. Perry, et al, vol. 47, pp. 577–599, 1971.
Article entitled "The Dynamic Response of Constant Resistance Anemometers" in Scientific Instruments of The Institute of Physics and the Physical Society, by M. R. Davis, vol. 3, pp. 15–20, Jan. 1970.
"Use of Shaped Gain Feedback in Constant Temperature Thermal Anemometers" by Peter Freymuth, Dept. of Aerospace Engineering Sciences, University of Colorado, Boulder, Colorado (pp. 15–1–15–5): 1981.
"Off–Optimum Operation of Hot–Wire Anemometers and Analysis of an Anemometer with Shaped Bridge Impedance" in vol. 3 of Various Sensor Applications, pp. 38–51, by Peter Freymuth.
Sensors & Systems '82 Pasadena Conference, May 18–20.

Primary Examiner—Richard Chilcot
Assistant Examiner—Harshad Patel
Attorney, Agent, or Firm—Frederick W. Niebuhr

[57] ABSTRACT

An electrical control circuit for a constant temperature anemometer includes a first operational amplifier coupled to receive inputs from two intermediate terminals of the Wheatstone bridge, and to generate an output voltage in response to a difference in voltage between the intermediate terminals. A second operational amplifier receives the output voltage, and provides its output as a drive voltage to the Wheatstone bridge. The second operational amplifier also provides its output to a feedback loop which incorporates an A/D converter, a digital processor and a D/A converter. The amplifier analog output is converted to a digital signal. The digital processor calculates a digital offset value, based on a constant ratio of the digital offset value/digital signal, predetermined by selection and setting of the various control circuit components. The D/A converter converts the digital offset value to an offset voltage provided to the second operational amplifier as an input. Thus, the second amplifier output is continuously and automatically modified by the appropriately calculated offset voltage, which leads to circuit stability and reliability over a much wider frequency bandwidth.

20 Claims, 2 Drawing Sheets

AUTOMATIC OFFSET CONTROL FOR CONSTANT TEMPERATURE ANEMOMETER

BACKGROUND OF THE INVENTION

The present invention relates to constant temperature anemometers, and more particularly to the control circuitry for adjusting the electrical response in such anemometers upon sensing departures from a predetermined sensor operating temperature.

Thermal anemometers are used to sense highly localized velocities in fluid flows. A minute sensing element is placed in the fluid flow, and heated to a temperature above that of the fluid. The element loses heat to the fluid at a rate that increases with increases in the fluid velocity, assuming of course that other characteristics such as fluid temperature remain constant. Thermal anemometry frequently is called "hot wire anemometry" or "hot film anemometry", reflecting the types of sensing elements most frequently employed. Wire sensing elements have diameters on the order of 5–15 microns, typically formed of tungsten coated with platinum; platinum; and platinum/iridium alloys. An example of a film sensor is a platinum thin film applied to a fused quartz substrate.

The sensing element material must have a resistance that varies with temperature. For most such materials, resistance increases linearly with temperature according to the equation:

$$R_s/R_o = 1 + \alpha(T_s - T_0) \tag{1}$$

where $R_0$ is the sensing element resistance at a reference temperature, e.g. either zero degrees C. or room temperature; $T_0$ is the reference temperature; $T_s$ is the sensor operating temperature; and $\alpha$ (alpha) is the temperature coefficient of resistance. $R_s/R_o$ is known as the "overheat ratio". As one example, tungsten has coefficient $\alpha$ of 0.0042 ohms/°C.

In a conventional constant temperature anemometer (FIG. 1), a sensing element 16 is incorporated into an arm 18 of a Wheatstone bridge 20 having three other arms indicated at 22, 24, and 26. Between the arms are several junctions or terminals, including a drive terminal 28, a base terminal 30, and two intermediate terminals 32 and 34. Base terminal 30 is maintained at ground. Drive terminal 28 is biased to a drive voltage that is variable to control the current through the bridge, and more specifically current through sensing element 16 to control resistance $R_s$. Fixed resistors 36 and 38 are provided along arms 22 and 24, respectively. Along arm 18 is a "resistor" 40 that does not vary with temperature. However, because it represents a resistance $R_c$ of components that accompany the sensing element (such as probe, support and cable), it is subject to change whenever one sensing element is substituted for another. Likewise, an inductance 42 varies with different probes, etc. A capacitor 43 represents the capacitance of these same components. Accordingly, an adjustable resistor 44 and an adjustable inductor 46 are provided along arm 26.

Fixed resistors 36 and 38 determine the bridge ratio. The bridge ratio (resistance of 38 divided by resistance of 36) can be 1:1, but frequently is 5:1 or 10:1 to channel the greater share of the current through the "active" side of the bridge, i.e. arms 18 and 22. The adjustable resistor 44 and inductor 46 for tuning the bridge are preferably on the passive side of the bridge (arms 24 and 26).

The components of the bridge are selected and adjusted so that when sensing element 16 is at the selected operating temperature, resistance $R_3$ of resistor 44 as compared to the combined resistance $R_c$ and $R_s$ replicates the bridge ratio, with the result that the voltages at intermediate terminals 32 and 34 are the same. A fluid velocity decrease causes an increase in sensor temperature and increases $R_s$, thus to increase the voltage at terminal 32. An operational amplifier 48, responsive to sensing the bridge imbalance, generates a reduced voltage as its output, i.e. the drive voltage is reduced. This reduces current along both the active and passive sides of the bridge. The reduction in current through sensing element 16 decreases its temperature, and thus decreases its resistance.

Conversely, an increase in fluid velocity removes heat from the sensing element more rapidly, decreasing its temperature, whereupon the reverse sequence occurs. In either event, amplifier 48 responds to a sensed imbalance in the bridge, to drive sensing element 16 back toward the selected operating temperature and resistance. The drive voltage thus is a measure of the rate at which the fluid removes heat from the sensing element. Assuming constant temperature (or a means to compensate for fluid temperature changes), the heat removal rate is a direct function of fluid velocity.

Constant temperature (or constant resistance) anemometers are considered superior to constant current systems in measuring turbulent or unsteady flows, due to substantially reduced sensor temperature variation in response to a given change in fluid velocity. The small size, high frequency response and low noise characteristics of the wire and film sensors facilitates their use in measuring turbulent flows. The constant temperature approach also is considered advantageous because of the substantially flat frequency response over a wider range of fluid velocities without the need for adjustment, and the relative ease in compensating for changes in fluid temperature, either by incorporating a temperature sensitive element in the bridge or by measuring and compensating for temperature.

A disadvantage of the constant temperature anemometer is the need to optimize frequency response of the system, primarily by adjusting the operational amplifier gain and the bridge reactance. The amplifier gain in the constant temperature anemometer is valid only for a particular flow velocity (i.e., a particular sensor heat loss rate) and a limited range about that velocity. Deviations from that velocity can lead to significant error and cause self-excitation in the system. Accordingly, N. B. Wood (A Method for Determination and Control of the Frequency Response of the Constant-Temperature Hot-Wire Anemometer, Journal of Fluid Mechanics, 1975, Volume 67, Part 4, pp. 769–786) observes that frequency response is affected by changes in flow conditions. Wood found the frequency response to vary with the mean bridge voltage, charting an increase in preferred amplifier gain setting from 145 to 760 as mean bridge voltage ranged from about 4.2 to about 1.5 volts. Based on this relationship, Wood advised operators to observe the mean bridge voltage under operating conditions and set the amplifier gain based on the measured value of mean bridge voltage. Besides adjusting gain, it is known to reduce the bandwidth of the operational amplifier and reduce feedback effects.

Wood also reported that a change in the overheat ratio affects the appropriate gain setting of the operational amplifier. The overheat ratio can change due to a difference in fluid temperature or substitution of another sensing element.

Sensing element substitution gives rise to the need to adjust bridge reactance to match the probe cable and associated wiring. Resistance $R_3$ and inductance $L_2$ of inductor 46 are adjusted to tune the bridge to the particular sensor, probe, cable and flow conditions.

The need for these adjustments adds to the difficulty of using the constant temperature anemometer and severely limits its utility in monitoring turbulent, unsteady flows.

Therefore, it is an object of the present invention to provide a constant temperature anemometer with a broader operating frequency bandwidth and a more consistent frequency response over widely varying fluid velocities.

Another object is to provide, in a constant temperature anemometer, a means for automatically adjusting operational amplifier offset based on a detected imbalance in the bridge circuit.

Yet another object is to provide a bridge circuit incorporating a resistance that varies with a measured parameter, in combination with a means for continually optimizing the gain of an amplifier that controls the current through the resistance.

SUMMARY OF THE INVENTION

To achieve these and other objects, there is provided a device for continually adjusting a bridge circuit toward a balanced state in a high frequency response mode. The device includes a bridge circuit having several bridge arms and junction terminals including a drive terminal at a drive voltage, a base terminal at a constant base voltage, and first and second intermediate junction terminals. The junction terminals have respective first and second voltage levels less than the drive voltage and greater than the base voltage. A sensing element is provided in one of the bridge arms. The sensing element has a resistance that varies with a parameter being measured by the sensing element. The first and second voltage levels are equal whenever the measured parameter has a predetermined value. These voltage levels are different from one another, however, whenever the measured parameter has a value other than the predetermined value. A detecting means receives the first and second voltage levels and generates an output voltage as a function of the difference between the first and second voltage levels. An offset voltage generating means, coupled to receive the output voltage, generates an offset voltage proportional to the output voltage. A control means is provided for combining the offset voltage and the output voltage to generate a modified voltage. The modified voltage is provided to the drive terminal as a drive voltage.

A preferred form of the device is a constant temperature anemometer in which the sensing element resistance varies with its temperature. The sensing element is positioned in a fluid flow and heated to a temperature above that of the fluid, whereby its temperature is a function of the fluid flow velocity.

The preferred detecting means is a high-speed, low-noise operational amplifier. The control means can comprise a second operational amplifier coupled to receive the output voltage from the first operational amplifier. The offset voltage generating means can be provided within a feedback loop of the second operational amplifier. In particular the offset voltage generating means can include an analog-to-digital converter, a digital processor and a digital-to-analog converter. Along the feedback loop: the amplifier output is converted to a digital signal; the digital signal is processed to yield a processor output of a digital offset value; and the digital offset value is converted to the desired offset voltage.

The desired offset voltage depends upon the amplifier output. More particularly, the offset voltage $E_B$ is computed based on a constant ratio of $E_B/E$, where E is the amplifier output. The ratio is predetermined, based on the circuit components including the design gain and time constant of the amplifier.

In one embodiment a fixed inductance is provided along the sensing arm of the Wheatstone bridge. This approach is discussed in an article by Wei et al entitled "Recent Researches on Experimental Turbulence in Peking University" (Proceedings of the International Conference on Fluid Mechanics and Theoretical Physics, 1992); and in a brochure by Sheng Sen-Zhi entitled "Model IFV-900 Intelligent Flow Measurement System Introduction" published by Peking University, Department of Mechanics.

Further in accordance with the invention, there is provided a process for continually adjusting the temperature of a temperature responsive resistance toward a predetermined temperature in a high frequency mode. The process includes the following steps:

(a) incorporating a temperature responsive resistance into a first bridge arm of a bridge circuit that includes several bridge arms and junction terminals;

(b) continually applying a drive voltage to a drive terminal of the bridge circuit, while maintaining a base terminal of the bridge circuit at a constant base voltage less than the drive voltage;

(c) selectively configuring the bridge circuit such that respective first and second voltage levels at respective first and second intermediate junction terminals of the bridge: (i) are equal whenever the temperature of the temperature responsive resistance is equal to a predetermined temperature; and (ii) differ from one another whenever the temperature of the temperature responsive resistance is not equal to the predetermined temperature;

(d) continually detecting the first and second voltage levels, said first and second voltage levels being greater than the base voltage and less than the drive voltage;

(e) detecting a difference in the first and second voltage levels and generating a voltage output as a function of said difference;

(f) generating an offset voltage proportional to the output voltage;

(g) combining the offset voltage and the output voltage to generate a modified voltage; and (h) applying the modified voltage to the drive terminal as the drive voltage.

Thus, the amplifier gain is continually adjusted, based on preserving a predetermined ratio of the amplifier offset to the amplifier output. As a result, the optimum frequency response is maintained in the anemometer circuit over a wide dynamic range of sensed conditions, most particularly a wide range of fluid velocities. This feature is advantageous in the monitoring of turbulent flows or unsteady flows, in which the rate of heat loss from the sensing element, and thus the sensor current necessary to maintain the desired temperature and resistance, are likely to vary substantially and abruptly.

DESCRIPTION OF THE DRAWINGS

For a further understanding of the above and other features and advantages, reference is made to the following detailed description and to the drawings, in which.

DETAILED DESCRIPTION OF THE PREFERRED EMBODIMENTS

Figure 1:
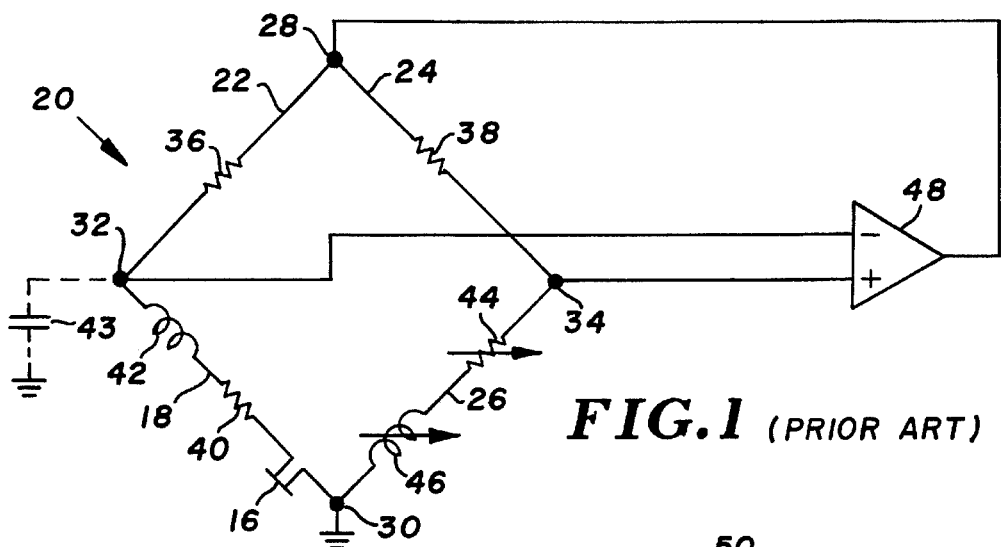
FIG. 1 is a schematic view of a conventional constant temperature anemometer control circuit.
Figure 2:
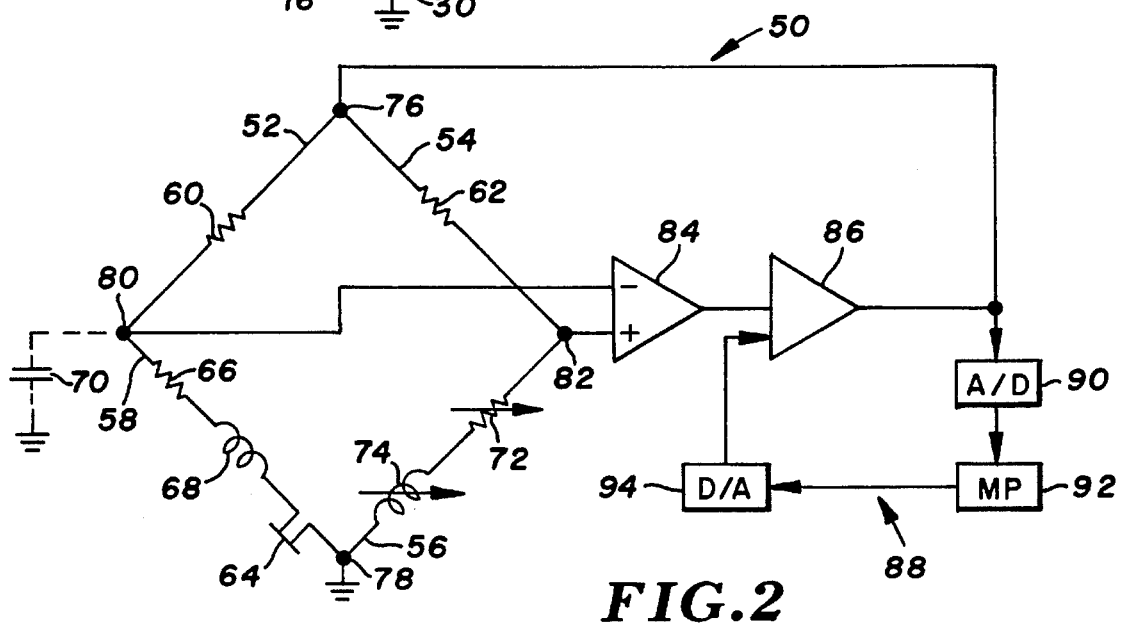
FIG. 2 is a schematic view of a constant temperature anemometer control circuit incorporating an automatic adjustment to operational amplifier gain in accordance with the present invention.

Turning now to the drawings, there is shown in FIG. 2 a constant temperature anemometer control circuit 50 including four bridge arms indicated at 52, 54, 56 and 58. Fixed resistors 60 and 62, in arms 52 and 54 respectively, determine the bridge ratio as explained above.

A sensing element 64, a sensing probe and cable (not shown) form arm 58 of the bridge. The sensing element has a resistance $R_s$ that varies with its temperature. A resistance 66 represents resistance of the probe, cable, and associated wiring. An inductance 68 represents the inductance of the sensing element, probe and cable. A capacitor 70 indicates the capacitance of these components.

Along arm 56 are a resistor 72 and an inductor 74, both of which are adjustable to enable a controlled setting of the resistance, and inductance respectively.

The bridge circuit can be considered to have two paths for current: an active path including arms 52 and 58, and a passive path including arms 54 and 56. When the bridge is balanced, current along the respective paths is equal in the case of a 1:1 bridge ratio, or is proportioned according to the inverse of the bridge ratio. A drive voltage E is applied to a drive terminal 76 of the bridge, while a base terminal 78 of the bridge is maintained at ground. Accordingly, current through sensing element 64, when the bridge is balanced, is governed by the voltage E and the bridge ratio. The resistance of resistor 72 is adjusted with reference to the combined resistance $R_c$ of resistor 66 and the sensor resistance $R_s$ at the selected operating temperature, such that arms 56 and 58 exhibit the same bridge ratio as arms 54 and 52. When sensing element 64 is at the selected temperature and resistance, the voltage levels at intermediate junction terminals 80 and 82 are equal.

Voltages at terminals 82 and 80 are provided respectively to the positive and negative terminals of a high-speed, low-noise operational amplifier 84. The output voltage of amplifier 84, which is a function of the difference between voltage levels of the intermediate terminals, is provided to an operational amplifier 86. In amplifier 86, the output voltage is combined with a selected offset voltage $E_B$ to produce a modified voltage E as the output of amplifier 86. Voltage E is applied to drive terminal 76, as the drive voltage.

Amplifier 86 also provides its output to a feedback loop 88, which incorporates an analog-to-digital converter 90, a digital processor 92 and a digital-to-analog converter 94. The A/D converter generates a digital signal based on the analog output of amplifier 86. The digital processor receives the digital signal and computes a digital offset value, providing the digital offset value to D/A converter 94. The D/A converter transforms the digital offset value to an analog offset and provides the analog offset voltage to amplifier 86. Thus, the output voltage of amplifier 86 is continually combined with an offset voltage, providing a modified voltage as the drive voltage to the Wheatstone bridge.

Digital processor 92 computes the offset voltage value (leading to offset voltage $E_B$) according to an optimal ratio of $E_B/E$, i.e. the mean offset voltage divided by the mean bridge voltage.

The appropriate ratio $E_B/E$ differs from one anemometer circuit to another and from one sensor to another, and is calculated based on known characteristics of the components selected for the anemometer circuit. With reference to FIG. 2, these would include:

$R_1$: resistance of resistor 60

$R_2$: resistance of resistor 62

$R_3$: resistance of resistor 72 (adjusted)

$R_c$: resistance of the cable $R_s$: resistance of sensor 64 (temperature dependent)

$L_c$: cable inductance $L_s$: inductance of arm 58

$L_2$: inductance of arm 56 (adjusted)

G: gain of amplifier 84

τ: time constant of amplifier 84

L: overheat ratio of sensing element 64 at selected operating temperature m: sensing element mass C: specific heat H: average heat dissipation The above values are determined, either directly or indirectly in view of a desired frequency response $f_0$, where $f_0$ is the cut-off frequency of the second order Butterworth low pass function. Selection of $f_0$ determines a quantity $\epsilon_0$, according to the formula:

$$\epsilon_0 = \tfrac{1}{2}\Pi f_0 \tag{2}$$

The value $f_1$ is the cut-off frequency of the third order Butterworth low pass function $$\epsilon_1 = \tfrac{1}{2}\Pi f_1 \tag{3}$$

Further calculated quantities include:

$M_{cc}$: constant current time constant of sensor 64, according to the formula:

$$M_{cc} = mCL/H \tag{4}$$

$M_{CT}$: constant temperature time constant of sensor 64, according to the formula:

$$M_{CT} = M_{cc}/2G(L-1) \tag{5}$$

$M'_{CT}$: first order constant temperature time constant calculated according to the formula:

$$M'_{CT} = M_{CT}(1+R_3/R_2) \tag{6}$$

Further calculated values include:

$$\Delta_1 = L_s/R_1 + R_c + R_s \tag{7}$$

$$\Delta_2 = L_2/R_2 + R_3 \tag{8}$$

$$\eta = \epsilon_0/\Delta_1 \tag{9}$$

$$\zeta = \epsilon_1 + \Delta_1 \tag{10}$$

Taking the above into account, the offset ratio is:

$$E_B/E = (\epsilon_0/M'_{CT})(\sqrt{2} + 2\zeta/\eta) \quad (11)$$

Figure 3:
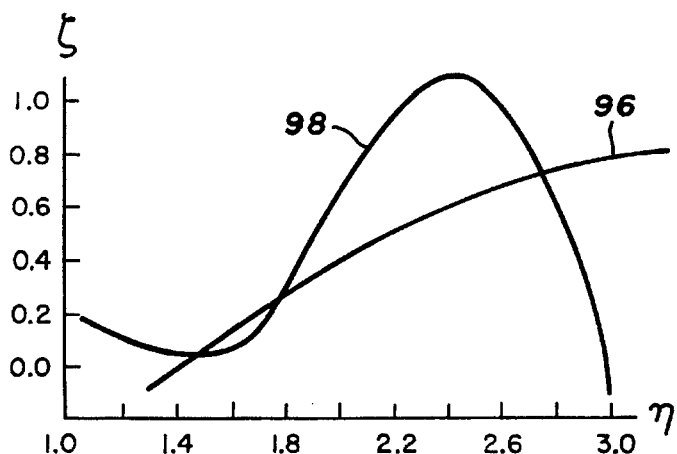
FIG. 3 is a chart illustrating the manner in which anemometer circuit components are taken into account in determining the desired amplifier offset.

FIG. 3 is a graph of η (absisa) versus ζ (ordinate), and is useful in considering how various circuit components are selected or adjusted. Selection of the desired $f_0$ in effect selects a desired $\epsilon_0$. Selection of sensing element 64 determines m and C. The values for $R_1$ and $R_2$ are set to determine the bridge ratio. The overheat ratio L is set, depending on the selected operating temperature of the sensing element. Since operating temperature also determines operating resistance of the sensing element, adjustable resistor 72 can be set so that its resistance $R_3$ matches the resistance along bridge arm 58. The values of G and τ depend on the selection and setting of amplifier 84.

The values η and ζ are related to one another in terms of the following equation:

$$O = (\eta^2 - \sqrt{2}\,\eta + 1)\zeta^3 - (2\eta - 2\sqrt{2}\,\eta + 2)\zeta^2 + \quad (12)$$

$$(2\eta^2 - 2\sqrt{2}\,\eta + 2)\zeta - (\eta^2 - \sqrt{2}\,\eta)$$

Line 96 on the chart is a plot of ζ versus η graphically showing this relationship.

The above values and the values for η and ζ are related by the following equation:

$$\epsilon_0 = \sqrt{(\tau/2G(L-1))(1 + R_3/R_2)(1 + (R_c + R_1)/R_s)} \quad (13)$$

From the above equation, the larger the value of ζ, the smaller the value for $\epsilon_0$ and the larger the frequency $f_0$. However, ζ must be larger than zero. Further, the quantity $M'_{CT}/\Delta_1$ (equal to $\epsilon_0 \eta \zeta^3/\tau$, shown in FIG. 3 as line 98), also must be greater than zero in order to have physical meaning for the underlying circuit. As a result, the value for ζ cannot exceed about 0.782, and must be at least about 0.025.

The range for ζ dictates a range for η as well, in that η must exceed about 1.45 but cannot exceed about 2.95. At the same time, the smaller the value for the quantity $M'_{CT}/\Delta_1$ (i.e. line 98), the better. This suggests that the value of η should be either in the range of about 1.45–2.0 or in the range of about 2.8–2.95. Given the desire for a larger value of ζ, the preferred range is about 2.8 to about 2.95 for η.

In view of the selection of $R_c$ and $R_s$ (through a selection of the sensing element and cable) and $R_1$, the choice of η also sets the inductance $L_s$ along the active path of the bridge, by virtue of equation (7) above.

When η, ζ, $f_0$ and the amplifier are selected, the constant $E_B/E$ is set enabling the programming of digital processor 92 to continually calculate the appropriate offset $E_B$ based on an input dependent upon the bridge voltage E.

Figure 4:
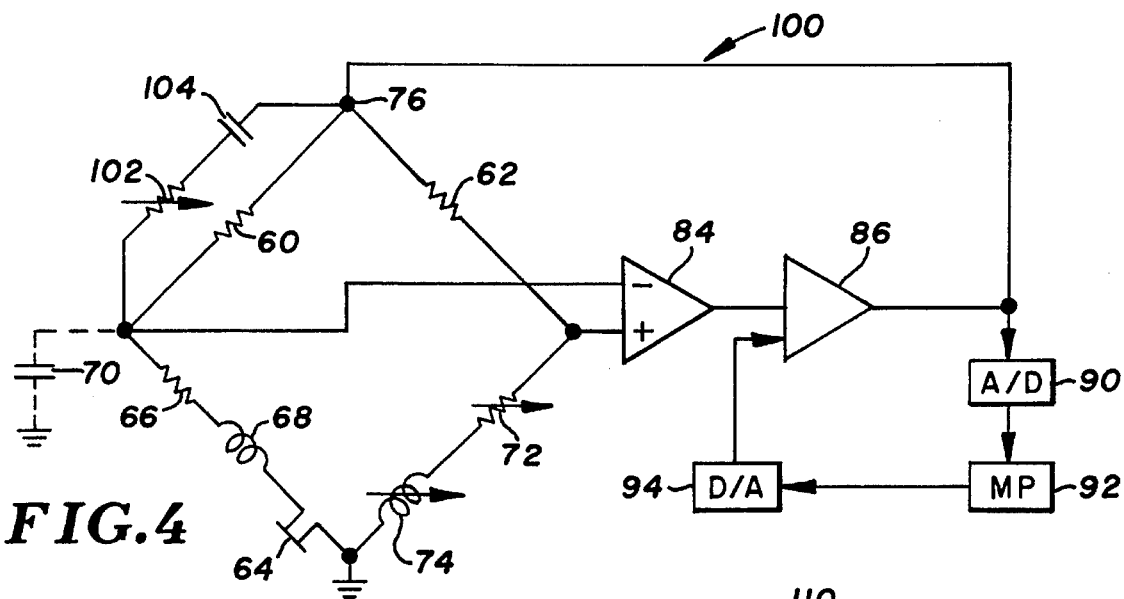
FIG. 4 is a schematic view of an alternative embodiment constant temperature anemometer control circuit constructed according to the present invention.

FIG. 4 shows an alternative embodiment constant temperature anemometer control circuit 100 substantially similar to anemometer 50, but with the addition of an adjustable resistor 102 and a capacitor 104 connected to terminals 76 and 80, to configure these components in parallel with resistor 60. A typical preferred bridge ratio of resistor 62 to resistor 60 is ten, to direct most of the current through the active path of the bridge. Accordingly, adjustable resistor 72 is set to about ten times the resistance $R_c$ plus $R_s$ at the selected operating temperature.

As disclosed in U.S. Pat. No. 4,523,462 (Kolodjski), resistor 102 and capacitor 104 provide an RC circuit used to adjust the frequency response of the bridge, in particular altering the effective impedance of arm 52, particularly at high frequencies to enhance stability.

Figure 5:
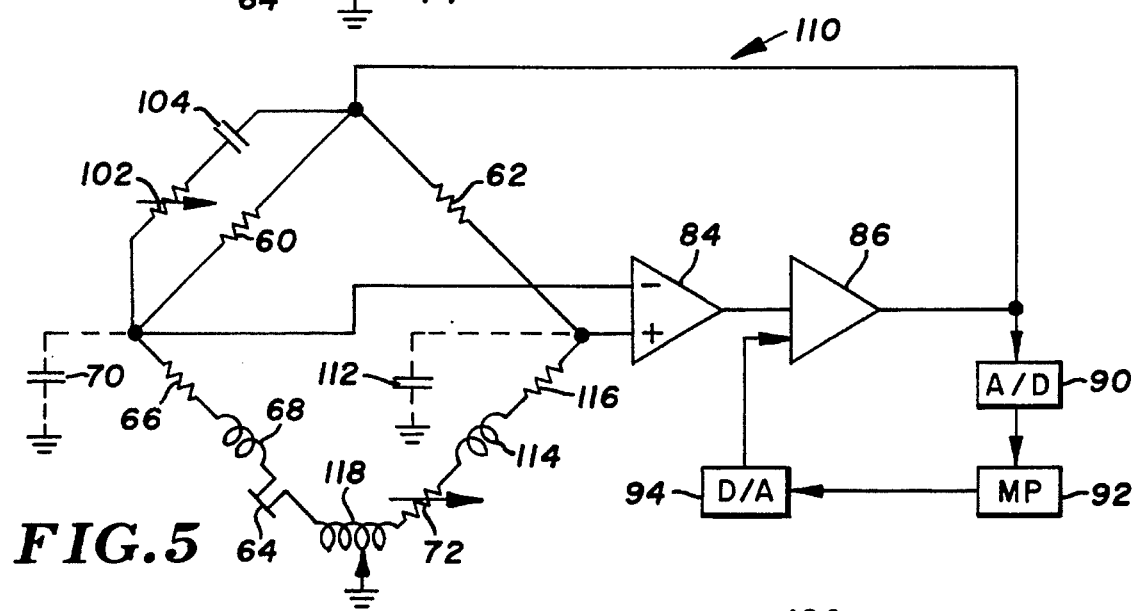
FIGS. 5 and 6 are schematic views of further alternative embodiment constant temperature anemometer control circuits constructed according to the present invention.

FIG. 5 shows a further alternative embodiment constant temperature anemometer control circuit 110 similar to circuit 100 shown in FIG. 4. Several difference, however, are a cable (not shown) connected along arm 56 and preferably having the same length (impedance) as the cable connected along arm 58. The result is an equivalent capacitor 112, inductor 114 and resistor 116 along arm 56, balancing counterpart capacitor 70, inductor 68 and resistor 66 along arm 58. The inductances of the active path and passive path are adjusted toward balance using an inductor 118 common to arms 56 and 58. Inductor 118 has a wiper movable to adjust the relative inductances and is coupled to base terminal 78.

Resistors 60 and 62 are the same, for a 1:1 bridge ratio. Also, adjustable resistor 72 is set to a resistance equal to $R_s$, the sensor resistance at the selected operating temperature. Circuit 110 affords substantially enhanced sensitivity, in the range of about 2–3 times the sensitivity of circuit 100.

Figure 6:
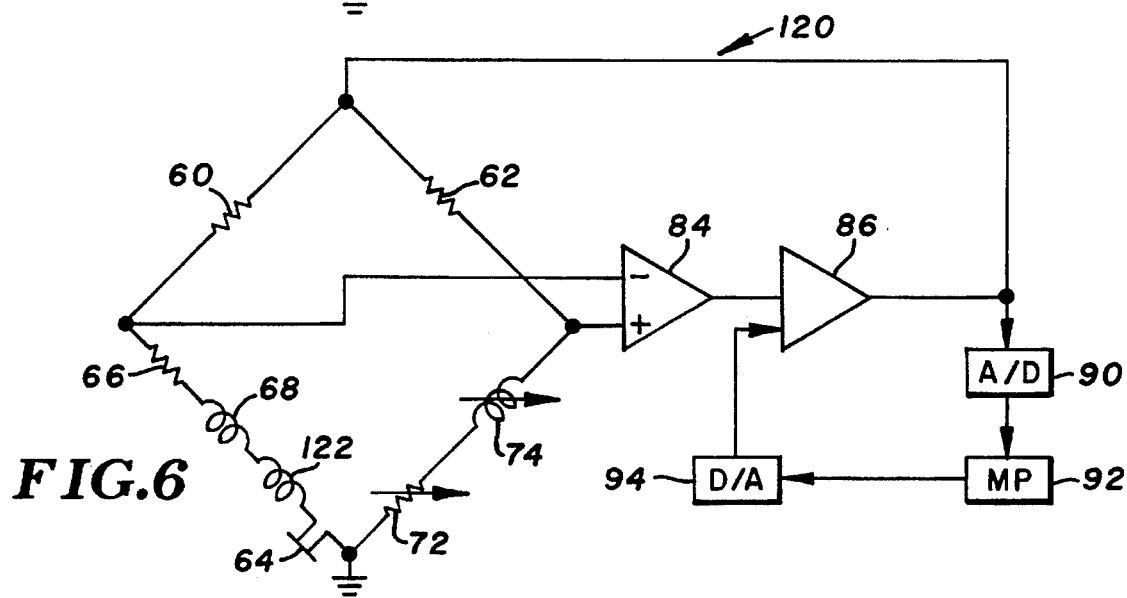

FIG. 6 shows a further alternative embodiment anemometer control circuit 120 substantially similar to circuit 50 except for a fixed inductor 122 having an inductance $L_0$, added along bridge arm 58. The bridge arm inductance thus becomes $L_0+L_c$. The inductance of inductor 74 in arm 56 is increased accordingly to maintain a balance of the inductance along the active and passive paths. The addition of fixed inductor 122 is beneficial where frequent changes in sensing element 64 are contemplated. Fixed inductance $L_0$ can diminish the impact of the sensor and cable inductance $L_c$, and circuit 120 is thus less susceptible to unintended effects from substituting sensing elements or cables. The added inductance $L_0$ also increases the impact of inductance (relative to capacitance) on cut-off frequency, which enhances stability. The added fixed inductance, in combination the automatic adjustment of amplifier gain, provides a constant temperature anemometer that can accommodate changes in sensors and cables, and changes in flow conditions, with minimal need for adjustment. At the same time, the fact that increasing the inductance tends to lower the cut-off frequency must be taken into account when considering adding fixed inductor 122 to the circuit.

Thus in accordance with the present invention, the circuitry controlling a constant temperature anemometer incorporates a means for continually and automatically calculating the appropriate offset voltage for driving the bridge circuit back toward a balanced state. This substantially increases the bandwidth of reliable circuit response, e.g. to more than 500 kHz with no end user adjustments, as compared to bandwidths on the order of 200–400 kHz in conventional control circuits that require operator adjustment. Consequently the system is capable of responding to substantial and abrupt changes in fluid velocities, leading to an instrument much better suited for characterizing unsteady and turbulent fluid flows.

What is claimed is:

1. A constant temperature anemometer, including:

a bridge circuit having several bridge arms and junction terminals including a drive terminal at a drive voltage, a base terminal at a constant base voltage, and first and second intermediate junction terminals at respective first and second voltage levels less than the drive voltage and greater than the base voltage;

a temperature responsive sensing element in a first one of the bridge arms and having a sensing element resistance that varies with the sensing element temperature, wherein the first and second voltage levels are equal whenever the temperature of the sensing element is equal to a selected temperature, and wherein the first and second voltage levels are different from one another whenever the sensing element temperature is not equal to the selected temperature;

a detecting means receiving the first and second voltage levels as inputs, for generating an output voltage as a function of the detected difference between the first and second voltage levels;

an offset generating means for receiving the output voltage and generating an offset voltage, said offset voltage being proportional to the output voltage, said offset voltage changing in response to changes in the output voltage; and a control means for combining the output voltage and the offset voltage to generate an adjusted output voltage, and for applying the adjusted output voltage to the drive terminal as said drive voltage.

2. The anemometer of claim 1 wherein:

said offset voltage generating means includes an analog-to-digital converter for generating a digital signal based on the output voltage, a digital processing means for calculating a digital offset value based on the digital signal, and a digital-to-analog converter for generating the offset voltage based on the digital offset value.

3. The anemometer of claim 1 wherein:

the detecting means comprises a fist operational amplifier.

4. The anemometer of claim 3 wherein:

the control means comprises a second operational amplifier operatively coupled to receive the output voltage from the first operational amplifier.

5. The anemometer of claim 4 wherein:

the offset voltage generating means comprises an analog-to-digital converter, a digital processor coupled to receive the analog-to-digital converter output, and a digital-to-analog converter coupled to receive the output of the digital processor.

6. The anemometer of claim 5 further including:

a feedback loop operatively coupled to the second operational amplifier, and wherein the analog-to-digital converter, the digital processor and the digital-to-analog converter are in the feedback loop.

7. The anemometer of claim 6 wherein:

said digital processor calculates the digital offset value according to a predetermined ratio $E_b/E$ where E is the output voltage of the second operational amplifier and $E_b$ is the offset voltage.

8. The anemometer of claim 1 further including:

a fixed inductance along the first bridge arm.

9. The anemometer of claim 1 wherein:

said sensing element resistance varies linearly with the temperature of the sensing element.

10. A device for continually adjusting a bridge circuit toward a balanced state in a high frequency response mode, including:

a bridge circuit having several bridge arms and junction terminals including a drive terminal at a drive voltage, a base terminal at a constant base voltage, and first and second intermediate junction terminals at respective first and second voltage levels less than the drive voltage and greater than the base voltage;

a sensing element in a first one of the bridge arms and having a sensing element resistance that varies with a parameter being measured by the sensing element, wherein the first and second voltage levels are equal whenever the measured parameter has a predetermined value, and wherein the first and second voltage levels are different from one another whenever the measured parameter has a value other than the predetermined value;

a detecting means for receiving the first and second voltage levels and for generating an output voltage as a function of the difference between the first and second voltage levels;

an offset voltage generating means for generating an offset voltage proportional to the output voltage; and a control means for combining the offset voltage and the output voltage, said offset voltage changing in response to changes in the output voltage to generate a modified voltage, and for providing the modified voltage to the drive terminal as the drive voltage.

11. The device of claim 10 wherein:

the offset voltage generating means includes an analog-to-digital converter, a digital processor and a digital-to-analog converter.

12. The device of claim 11 wherein:

the detecting means includes a first operational amplifier.

13. The device of claim 12 wherein:

the control means comprises a second operational amplifier operatively coupled to receive the output voltage from the first operational amplifier.

14. The device of claim 13 wherein:

the analog-to-digital converter is coupled to receive an output of the second operational amplifier and converts the amplifier output to a digital value, the digital processor calculates the digital offset value based on a constant ratio $E_B/E$, where E is the digital value and $E_B$ is a digital offset value:

wherein the digital-to-analog converter generates the offset voltage based on the digital offset value and provides the offset voltage as a feedback input to the second operational amplifier; and wherein the output of the second operational amplifier further is provided to the drive terminal as the drive voltage.

15. A process for continually adjusting the temperature of a temperature responsive resistance toward a predetermined temperature in a high frequency mode, including the steps of:

incorporating a temperature responsive resistance into a first bridge arm of a bridge circuit that includes several bridge arms and junction terminals;

continually applying a drive voltage to a drive terminal of the bridge circuit, while maintaining a base terminal of the bridge circuit at a constant base voltage less than the drive voltage, to provide a first voltage level at a first intermediate junction terminal of the bridge, and a second voltage level at a second intermediate terminal of the bridge, said first and second voltage levels being greater than the base voltage and less than the drive voltage;

selectively configuring the bridge circuit such that the first and second voltage levels are: (i) equal whenever the temperature of the temperature responsive resistance is equal to a predetermined temperature; and (ii) different whenever the temperature of the temperature responsive resistance is not equal to the predetermined temperature;

continually detecting the first and second voltage levels to detect a difference in the first and second voltage levels, and generating an output voltage as a function of said difference;

generating an offset voltage proportional to the output voltage, said offset voltage changing in response to changes in the output voltage;

combining the offset voltage and the output voltage to generate a modified voltage; and applying the modified voltage to the drive terminal as the drive voltage.

16. The process of claim 15 wherein the step of generating the offset voltage includes:

generating a first digital value based on the output voltage;

using a digital processor to calculate a desired digital value, based on a predetermined ratio of the digital offset value to the first digital value; and converting the digital offset value to said offset voltage.

17. The process of claim 15 wherein:

the steps of generating the offset voltage and combining the offset voltage and the output voltage are performed using an operational amplifier and a feedback loop, according to the following substeps:
 (a) providing the output voltage as an input to the operational amplifier;
 (b) providing the operational amplifier output to an A/D converter in the feedback loop, to provide the first digital value;
 (c) providing the first digital value to a digital processor in the feedback loop to calculate the digital offset value;
 (d) providing the digital offset value to a D/A converter in the feedback loop to generate the offset voltage; and
 (e) providing the offset voltage as an input to the operational amplifier.

18. The process of claim 17 wherein:

the step of applying the modified voltage to the drive terminal includes providing the output of the operational amplifier to said drive terminal.

19. A device for continually adjusting a bridge circuit toward a balanced state in a high frequency response mode, including:

a bridge circuit having several bridge arms and junction terminals including a drive terminal at a drive voltage, a base terminal at a base voltage, and first and second intermediate junction terminals at respective first and second voltage levels less than the drive voltage and greater than the base voltage, wherein the bridge circuit is in a balanced state when the first and second voltage levels are equal;

a sensing element in a first one of the bridge arms, said sensing element having a sensing element resistance that varies with a parameter being measured by the sensing element, thereby to vary the resistance in said first bridge arm and alter a difference between the first and second voltage levels;

a detecting means receiving the first and second voltage levels, for generating an output voltage as a function of said difference between the first and second voltage levels;

an offset voltage generating means for generating an offset voltage in response to receiving the output voltage, said offset voltage changing in response to changes in the output voltage, said offset voltage being proportional to the output voltage according to a ratio $E_B/E$, where E is the output voltage and $E_B$ is the offset voltage; and a control means for combining the offset voltage and the output voltage to generate a modified voltage, and for providing the modified voltage to the drive terminal as the drive voltage.

20. The device of claim 19 wherein:

the control means comprises an operational amplifier operatively coupled to receive the output voltage and having a feedback loop that includes the offset voltage generating means, said offset voltage generating means being programmable to determine the ratio $E_B/E$.

\* \* \* \* \*